United States Patent [19]

Jahnke

[11] Patent Number: 5,358,696
[45] Date of Patent: Oct. 25, 1994

[54] PRODUCTION OF $H_2$-RICH GAS

[75] Inventor: Frederick C. Jahnke, Rye, N.Y.

[73] Assignee: Texaco Inc., White Plains, N.Y.

[21] Appl. No.: 159,610

[22] Filed: Dec. 1, 1993

[51] Int. Cl.$^5$ .......................... C01B 3/24; C01B 3/26; C01B 3/12

[52] U.S. Cl. .................................. 423/650; 252/373; 423/652; 423/655; 423/656

[58] Field of Search ............... 423/650, 652, 655, 654, 423/656; 252/373

[56] References Cited

U.S. PATENT DOCUMENTS

| | | | |
|---|---|---|---|
| 3,418,082 | 12/1968 | Ter Haar | 423/652 |
| 3,699,218 | 10/1972 | Smith et al. | 423/650 |
| 4,021,366 | 5/1977 | Robin et al. | 423/655 |
| 5,152,976 | 10/1992 | Fong et al. | 423/655 |

*Primary Examiner*—Wayne Langel
*Attorney, Agent, or Firm*—George J. Darsa

[57] ABSTRACT

This invention relates to the production of hydrogen-rich gas by the partial oxidation of a saturated gaseous hydrocarbonaceous fuel or a mixture of saturated gaseous hydrocarbonaceous fuel and a liquid hydrocarbonaceous fuel in a gas generator. In the process, a saturated gaseous hydrocarbonaceous fuel from a subsequent fuel gas saturator is preheated by indirect heat exchange with a portion of shifted process gas stream from a catalytic water-gas direct shift conversion zone and reacted in said partial oxidation gas generator. The process gas stream from the noncatalytic partial oxidation gas generator is quench cooled and scrubbed with water and preheated by indirect heat exchange with a second portion of the process gas stream from the shift conversion zone prior to catalytically reacting the CO and $H_2O$ in the process gas stream in the shift conversion zone to increase its $H_2$ content. The shifted process gas stream is cooled and dewatered to produce shift condensate which is used to saturate the aforesaid preheated gaseous hydrocarbonaceous fuel feedstream to the partial oxidation gas generator.

42 Claims, 1 Drawing Sheet

PRODUCTION OF H₂-RICH GAS

BACKGROUND OF THE INVENTION

Field of the Invention

This invention relates to the production of hydrogen-rich gas by the partial oxidation of a water saturated gaseous hydrocarbonaceous fuel or a mixture of water saturated gaseous hydrocarbonaceous fuel and a liquid hydrocarbonaceous fuel.

The production of hydrogen-rich gas by the partial oxidation of a liquid hydrocarbonaceous feed or a pumpable slurry of solid carbonaceous feed to produce a raw feed gas which is cleaned and purified and then reacted in a catalyst bed consisting of an alkali-metal promoted mixture of copper uranate and copper oxide to produce a product gas comprising about 20 to 60 mole % hydrogen along with water and acid gases is disclosed in coassigned U.S. Pat. No. 4,338,292. In coassigned U.S. Pat. No. 4,021,366, the process gas stream from the partial oxidation of a liquid hydrocarbon material or a slurry of solid carbonaceous feed is cooled, scrubbed, and water-gas shifted in a bed of low temperature catalyst followed by a bed of high temperature catalyst. In coassigned U.S. Pat. No. 5,152,976, refinery offgas is partially oxidized. However, none of these processes teach applicant's highly efficient process which saturates gaseous hydrocarbonaceous fuel with shift condensate that is heated by direct contact with the process gas stream, and which preheats the saturated gaseous hydrocarbonaceous fuel by indirect heat exchange with at least a portion of the shifted process gas stream prior to introducing the saturated preheated gaseous fuel into the partial oxidation gas generator either alone or as a mixture of saturated gaseous hydrocarbonaceous fuel and liquid hydrocarbonaceous fuel.

SUMMARY

This is a process for producing hydrogen-rich gas from a gaseous hydrocarbonaceous fuel having a minimum C/H wt. ratio of 3.3, such as refinery off-gas, or a mixture of gaseous and liquid hydrocarbonaceous fuel such that the C/H weight ratio in the mixture is greater than 3 3/1. When refinery off-gas and similar gaseous streams with or without mixture with a liquid hydrocarbonaceous fuel are gasified by partial oxidation, water, or steam, moderation is required in order to maintain the reducing mole ratio ($H_2+CO/H_2O+CO_2$) of the process gas stream at a reasonable level to avoid producing excessive soot. This invention supplies the moderator to the gasifier cheaply and efficiently using direct shift condensate contact to pick up moisture into the feed gas using heat from the gas cooling and scrubbing of the syngas and transferring it to the vaporization of water into the feed gas. The heat used is low level heat which is normally discarded to the cooling water. Further, by saturating the fuel gas, there are reductions in the atomic ratio O/C in the partial oxidation gasifier, soot make, and required temperature moderator. The unit efficiency is thereby increased.

This is a partial oxidation process for the production of H₂-rich gas comprising the following steps:

(1) reacting by partial oxidation a fuel feed comprising a hydrocarbonaceous fuel having a minimum C/H weight ratio of 3.3 and comprising a stream of water saturated gaseous hydrocarbonaceous fuel or a mixed stream of said saturated gaseous hydrocarbonaceous fuel and a liquid hydrocarbonaceous fuel at a temperature in the range of about 2000° F. to 2800° F., and a pressure in the range of about 200 to 2500 psia, with a stream of substantially pure oxygen gas at an atomic ratio of oxygen gas to carbon in the fuel in the range of about 0.6 to 1.6, a weight ratio H₂O/fuel in the range of about 0.1 to 5.0, and including supplemental H₂O temperature moderator, wherein said partial oxidation reaction takes place in the reaction zone of a free-flow non-catalytic partial oxidation gas generator to produce a process stream of synthesis gas comprising $H_2$, $CO$, $CO_2$, $H_2O$, $N_2$, $H_2S$, $COS$ and particulate carbon, and having a reducing mole ratio $H_2+CO/H_2O+CO_2$ in the range of about 5 to 15;

(2) quench cooling and scrubbing the process gas stream from (1) with water in gas quenching and scrubbing zones to produce clean process gas stream having a temperature in the range of about 300° F. to 600° F.;

(3)(a) heating the process gas stream from (2) to a temperature in the range of about 500° F. to 700° F. by indirect heat exchange with a first portion of the direct shifted process gas stream from subsequent step (4); and (b) passing the remainder of said direct shifted process gas stream from step (4) in indirect heat exchange with water saturated hydrocarbonaceous gaseous fuel from subsequent step (9), thereby heating said gaseous hydrocarbonaceous fuel feed to a temperature in the range of about 400° F. to 800° F., and introducing said heated water saturated gaseous fuel feed into said partial oxidation gas generator in (1) as at least a portion of the fuel;

(4) passing the heated process gas stream from step (3)(a) through a catalytic water-gas direct shift conversion zone to produce a H₂-rich shifted process gas stream having a reducing mole ratio $H_2+CO/H_2O+CO_2$ of less than 2;

(5) combining the two streams of partially cooled direct shifted process gas stream from (3) (a) and (3) (b) and partially cooling the combined process gas stream to a temperature in the range of about 260° F. to 550° F. by indirect heat exchange with boiler feed water thereby producing medium pressure steam or hot boiler feed water;

(6) mixing the partially cooled shifted process gas stream from step (5) with supplemental shift condensate from subsequent step (8), wherein said supplemental shift condensate is heated by direct contact with said partially cooled shifted process gas stream;

(7) dewatering the mixture of shifted process gas and shift condensate from (6) in a knock-out chamber and separating heated shift condensate;

(8) cooling and dewatering the shifted process gas stream from step (7) in a dewatering process gas stream zone to produce shift condensate by cooling the process gas stream below the dew point and collecting the condensed water in at least one knock-out chamber; and (9) saturating a feedstream of hydrocarbonaceous gaseous fuel with at least a portion of said heated shift condensate from step (7) in a gas saturating zone.

BRIEF DESCRIPTION OF THE DRAWING

A more complete understanding of the invention may be had by reference to the accompanying drawing which illustrates a preferred embodiment of the invention. It is not intended to limit the subject invention to the particular process or materials described.

DESCRIPTION OF THE INVENTION

In the subject process, a raw process gas stream, substantially comprising $H_2$, $CO$, $CO_2$, $H_2O$, entrained particulate matter comprising particulate carbon and ash; and at least one material from the group $N_2$, $Ar$, $COS$, $H_2S$, $CH_4$, and $NH_3$ is produced by partial oxidation of a gaseous hydrocarbonaceous fuel or a mixture of a gaseous and liquid hydrocarbonaceous fuel with substantially pure oxygen, in the presence of a temperature moderator, in the reaction zone of an unpacked, vertical, free-flow noncatalytic partial oxidation gas generator. The $H_2O$/fuel weight ratio in the reaction zone is in the range of about 0.1 to 5, and preferably about 0.2 to 0.7. The atomic ratio of free oxygen to carbon in the fuel (O/C ratio), is in the range of about 0.6 to 1.6, and preferably about 0.8 to 1.4. The reaction time is in the range of about 0.1 to 50 seconds, such as about 2 to 6 seconds.

The raw fuel gas generator comprises a vertical cylindrically shaped steel pressure vessel lined with refractory, such as shown in coassigned U.S. Pat. No. 2,809,104, which is incorporated herein by reference. A typical quench drum is also shown in said patent. A 2, 3, or 4 stream annular-type burner, such as shown in coassigned U.S. Pat. Nos. 3,874,592; 3,743,606, and 4,525,175, respectively, which are incorporated herein by reference, may be used to introduce the feed streams into the reaction zone.

The fuel feed mixture to the partial oxidation gas generator has a minimum C/H weight ratio of 3.3. A wide range of combustible gaseous hydrocarbonaceous fuels or gaseous and liquid hydrocarbonaceous fuels may be reacted in the gas generator with substantially pure oxygen gas, in the presence of a temperature moderating gas, to produce the raw process gas stream.

Gaseous hydrocarbonaceous fuels that may be burned in the partial oxidation gasifier alone or along with the liquid hydrocarbonaceous fuel includes refinery off-gas, mixtures of $C_1$-$C_4$ hydrocarbonaceous gases and waste carbon-containing gases from chemical processes. The term "refinery offgas" as used herein refers to the various gas streams which are generated by different units in a petroleum refinery, such as gas produced from the fluid catalytic cracker (FCC) unit, delayed and fluidized coking units, catalytic reforming unit, and the hydrotreating unit. Refinery offgas generally contains saturated and unsaturated hydrocarbons and other impurities, such as organic sulphur, nitrogen species, and inorganic agents including $H_2S$, $COS$, $SO_x$, $NH_3$, $HCN$, and arsine. The gaseous hydrocarbonaceous fuel comprises a plurality of gaseous components selected from the group consisting of $H_2$, $N_2$, $O_2$, $RSH$, $CH_4$, $C_2H_4$, $C_2H_6$, $C_3H_6$, $C_3H_8$, $C_4H_8$, $C_4H_{10}$, $C_5H_{10}$, $C_5H_{12}$, $CO$, $CO_2$, and $H_2O$ as shown below in Table I.

TABLE I

| Component | Mole Percent Range | Refinery Gas* |
|---|---|---|
| $H_2$ | 8–40 | 15.6 |
| $N_2$ | 0–10 | 0.5 |
| $CH_4$ | 20–60 | 38.1 |
| $CH_2H_4$ | 1–25 | 1.7 |
| $C_2H_6$ | 1–20 | 10.2 |
| $C_3H_6$ | 0–20 | 3.0 |
| $C_3H_8$ | 0–20 | 10.9 |
| $C_4H_8$ | 0–10 | 2.4 |
| $C_4H_{10}$ | 0–15 | 7.8 |
| $C_5$ | 0–10 | 3.2 |

TABLE I-continued

| Component | Mole Percent Range | Refinery Gas* |
|---|---|---|
| $CO$ | 0–5 | 0.0 |
| $CO_2$ | 0–5 | 0.5 |
| $O_2$ | — | 1000 ppm |
| Acetylene | — | 100 ppm |
| Diolefins | — | 100 ppm |
| Aromatics | — | 200 ppm |
| RSH (mercaptans) | — | 100 ppm |
| $H_2S$ | 0–4 | 20 ppm |
| $COS$ | 0–1 | 10 ppm |
| $SO_x$ | — | 5 ppm |
| $NH_3$ | — | 5 ppm |
| $HCN$ | — | 10 ppm |
| Arsine | — | 20 ppb |
| Btu/SCF | 700–1400 | 1500 |
| C/H Wt. Ratio | >3.3 | 3.9 |

*Values represent mole percent unless indicated otherwise.

Some properties of gaseous hydrocarbonaceous fuels are shown in Table II.

TABLE II

| | Natural Gas | Refinery Gas From Coker | Other Refinery Gas |
|---|---|---|---|
| C/H, Wt. Ratio | 3.0 | 3.9 | 4.3 |
| Higher Heating Value, BTU/SCF | 1050 | 1500 | 1750 |
| Molecular Weight | 16 | 26 | 31 |

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks to the gasifier, is intended to include various materials, such as liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The liquid hydrocarbonaceous feed may be at room temperature, or it may be preheated to a temperature up to as high as about 600° F. to 1200° F. but preferably below its cracking temperature. The liquid hydrocarbonaceous feed may be introduced into the gas-generator burner in liquid phase or in a vaporized mixture with the temperature moderator.

The need for a temperature moderator to control the temperature in the reaction zone of the gas generator depends in general on the carbon-to-hydrogen ratios of the feedstock and the oxygen content of the oxidant stream. A temperature moderator is used with liquid hydrocarbon fuels with substantially pure oxygen. Steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include water, $CO_2$-rich gas, nitrogen, and recycled synthesis gas.

The term substantially pure oxygen gas or oxygen gas as used herein means greater than about 90% mole oxygen (the remainder usually comprising $N_2$ and rare gases). The stream of oxygen gas may be introduced into the reaction zone by way of the partial-oxidation burner at a temperature in the range of about ambient to 900° F.

A conventional air separation unit (ASU) is used to separate air into separate streams of substantially pure oxygen gas and nitrogen gas. The stream of oxygen gas from the ASU at a temperature in the range of about ambient to 900° F. is introduced into the reaction zone of the partial oxidation gas generator by way of one or more passages in an annulus-type burner. In one embodiment, steam as the temperature moderator is introduced into the reaction zone of the gasifier in admixture with the stream of oxygen gas.

Before being burned, the gaseous hydrocarbonaceous fuel feed stream in the subject process is saturated by direct contact with shift condensate, also referred to herein as process condensate or condensate in the process gas stream after the water-gas shift reaction, and make-up water in a saturator. Advantageously, by saturating the fuel gas, there are substantial reductions in the atomic ratio O/C in the partial oxidation gasifier, the quantity of soot make, and the required amount of temperature moderator. The efficiency of the process is thereby increased. Any conventional gas-liquid direct contacting chamber may be used as the saturator, including conventional columns with trays and packing. Direct contact minimizes the temperature approach between the water and the gas, thereby maximizing heating and water vaporized into the gas.

The gaseous hydrocarbonaceous fuel feed stream at a temperature in the range of about ambient to 600° F. to and a pressure in the range of about 20 to 400 psia greater than that in the reaction zone of the partial oxidation gas generator, e.g., about 220 to 2900 psia is introduced into a saturator vessel. As it passes up through the saturator vessel, the stream of gaseous hydrocarbonaceous fuel comes into direct contact with shift condensate in admixture with or without make-up water at a temperature in the range of about 250° F. to 500° F. passing down through the saturator vessel. Feed gas saturated with water e.g. containing about 5 to 60 volume % $H_2O$ leaves from the top of the saturator vessel at a temperature in the range of about 250° F. to 450° F., and is further heated to a temperature in the range of about 400° F. to 800° F. by indirect heat exchange with a portion, e.g., about 20 to 80 vol. %, of catalytically direct shifted process gas stream to be described further. Advantageously, by the subject process water heated by low level process heat replaces steam injection requiring more costly high level heat. Further, by the use of readily available shift condensate to saturate the gas stream by direct contact in the saturator, costs are minimized. No separate special water stream is required.

In one embodiment, the preheated saturated gaseous hydrocarbonaceous feedstream is introduced into a partial oxidation gas generator by way of the central passage of a two passage annular-type burner comprising a central conduit and a coaxial concentric annular-shaped passage. The passages are closed at the upstream end where the feedstreams enter and are open at the downstream ends where the feedstreams are discharged. At the downstream tip of the burner, the passages develop into concentric converging conical-shaped nozzles. The water saturated gaseous hydrocarbonaceous fuel is passed through the burner at a temperature in the range of about 400° F. to 800° F. The substantially pure oxygen gas is passed through the burner at a temperature in the range of about 120° F. to 900° F. The two feed streams emerging from the burner impact together, mix, and react by partial oxidation in the reaction zone of the gas generator to produce raw synthesis gas. In another embodiment, a three passage annular type burner is used comprising a central conduit, a coaxial concentric intermediate annular shaped passage, and a coaxial concentric outer annular shaped passage. Simultaneously, a substantially pure oxygen gas stream is passed through the central conduit, a stream of liquid hydrocarbonaceous fuel with or without admixture with steam is passed through the intermediate passage, and a stream of $H_2O$ saturated gaseous hydrocarbonaceous fuel is passed through the outer annular passage. The three streams impact each other at the burner tip, atomize, mix, and react by partial oxidation in the reaction zone of the gas generator.

The raw process gas stream exits from the reaction zone at a temperature in the range of about 1700° F. to 3500° F., and preferably 2000° F. to 2800° F., and at a pressure in the range of about 200 to 2500 psia, and preferably 700 to 1500 psia. The composition of the hot-raw effluent gas stream is about as follows, in mole percent: $H_2$ 10 to 70, CO 15 to 60, $CO_2$ 0.1 to 25, $H_2O$ 0.1 to 25, $CH_4$ nil to 60, $NH_3$ nil to 5, $H_2S$ nil to 10, COS nil to 1.0, $N_2$ nil to 60, Ar nil to 2.0, HCN and HCOOH nil to 100 parts per million (weight basis). Particulate carbon is present in the range of about nil to 20 weight % (basis carbon content in the original feed). Ash and-/or molten slag may be present respectively in the amounts of about nil to 5.0 and nil to 60 weight % of the original liquid hydrocarbonaceous or solid carbonaceous fuel feed.

In a preferred embodiment of the subject process all of the hot raw effluent fuel gas stream leaving the refractory lined, down flowing, noncatalytic, reaction zone of the partial oxidation gas generator at substantially the same temperature and pressure as in the reaction zone, less ordinary drop in the lines is directly introduced into a pool of water contained in the bottom of a quench drum or tank such as the one described in coassigned U.S. Pat. No. 2,896,927 which is herewith incorporated by reference. The subject process is unique in that a quench gasification configuration is used to minimize investment and maintenance costs and to maximize the quenched gas temperature and water content. If heat were removed from the gasifier exit gas prior to quenching, the quenched gas would be at too low a temperature and water content to shift the CO in the gas to $H_2$.

The quench drum is located below the reaction zone of the gas generator, and the stream of raw fuel gas which it receives carries with it substantially all of the ash and/or slag and the particulate carbon soot leaving the reaction zone of the gas generator. The turbulent condition in the quench drum, caused by large volumes of gases bubbling up through the water helps the water to scrub much of the solids from the effluent gas. Large quantities of steam are generated within the quench vessel and saturate the gas stream. The stream of raw gas is cooled in the quench drum and leaves at a temperature in the range of about 300° F. to 600° F., such as about 450° F. to 550° F. and a pressure in the range of about 200 to 2500 psia, such as about 700 to 1500 psia. Advantageously, the fresh quench water used in the subject invention is a mixture of make-up water and shift condensate from the gas scrubber as produced subsequently in the process. The expression "and/or" is used herein in its ordinary way. For example, A and/or B means either A or B or A+B.

In order to prevent the plugging of downstream catalyst beds and/or the contaminating of liquid-solvent absorbents that may be used in subsequent gas purification steps, the cooled and partially cleaned process gas stream leaving the quench drum is further cleaned by contact with hot scrubbing water in another gas cleaning zone. This gas cleaning zone may include a conventional orifice such as shown and described in coassigned U.S. Pat. No. 3,524,630 which is incorporated herein by reference and conventional venturi scrubbers and sprays, along with a gas scrubbing chamber such as shown and described in coassigned U.S. Pat. No. 3,232,727, which is incorporated herein by reference. In the gas scrubbing chamber, the stream of raw fuel gas is scrubbed with scrubbing water comprising hot recycle shift condensate and make-up water as described herein. For example, in one embodiment the gas stream leaving the quench tank associated with the gasifier is scrubbed and intimately contacted with scrubbing water comprising shift condensate, in a venturi scrubber. In one embodiment, the scrubbing water comprises about 50 to 80 wt. % shift condensate and the remainder make-up water. However, the use of a venturi scrubber in the gas cleaning zone is optional. The process gas stream passes into and up through a pool of gas scrubbing water contained in the bottom of a gas scrubbing chamber. The scrubbed gas is then passed up through a packed section or trays in the upper portion of the scrubbing chamber where it is contacted by shift condensate and make-up water, i.e., scrubbing water flowing in a downward direction. Scrubbing water in the bottom of the gas scrubbing chamber may be recycled to a venturi scrubber, if there is one, and/or to the quench tank associated with the gasifier. By the gas cleaning procedure used in the subject process, the process gas stream is saturated with water and the amount of solid particles in the scrubbed fuel gas stream is reduced to a very low level such as less than about 10 parts per million (ppm), and preferably less than about 1 ppm.

The temperature of the saturated scrubbed clean process gas stream leaving the gas scrubber at a temperature in the range of about 300° F. to 600° F. is increased to a temperature in the range of about 500° F. to 700° F., such as about 575° F. to 625° F. This is done by passing the clean process gas stream in indirect heat exchange in a first heat exchanger, such as in a conventional shell and tube heat exchanger, with a portion, e.g., about 20 to 80 volume %, of the hot shifted process gas stream, leaving a conventional direct catalytic water-gas shift conversion zone at a temperature in the range of about 550° F. to 1050° F. such as 600° F. to 900° F. The remainder of the hot shifted process gas stream is used to preheat by indirect heat exchange in a second heat exchanger a stream of saturated gaseous hydrocarbonaceous fuel prior to said gas stream being introduced into the gas generator. Said first and second heat exchangers may be connected in parallel or in series. A typical catalytic water-gas shift conversion zone is described in coassigned U.S. Pat. No. 4,052,176, which is incorporated herein by reference. In the water-gas shift conversion zone, CO and $H_2O$ in the process gas stream at a temperature in the range of about 500° F. to 1050° F. and at a pressure which is substantially the same as that in the reaction zone of the partial oxidation gas generator less ordinary pressure drop in the lines, e.g., a pressure drop of about 15 to 30 psia, react together while in contact with a conventional catalyst to produce $H_2$ and $CO_2$. A suitable water-gas shift catalyst may comprise iron oxide promoted by 1 to 15 weight percent of an oxide of a metal, such as chromium, copper, thorium, uranium, beryllium, and antimony. Alternatively, cobalt molybdate on alumina may be used as the water-gas shift catalyst at a reaction temperature in the range of about 500° F. to 840° F. Co—Mo catalysts comprise in weight percent CoO 2–5, $MoO_3$ 8–16, MgO nil–20, and $Al_2O_3$ 59–85.

In the preferred embodiment wherein the aforesaid two indirect heat exchangers are connected in parallel, the two separate cooled portions of the shifted process gas stream leaving said first and second indirect heat exchangers are recombined to produce a process gas stream having a temperature in the range of about 400° F. to 600° F., such as about 500° F. In one embodiment with two indirect heat exchangers connected in series, all of the shifted process gas streams at a temperature in the range of about 550° F. to 1050° F. such as 600° F. to 900° F. is cooled to a temperature in the range of about 425° F. to 675° F. in a first indirect heat exchanger by heating the saturated process gas stream going into the water-gas shift conversion zone to a temperature in the range of about 500° F. to 700° F. All of the partially cooled process gas stream is then further cooled in the second indirect heat exchanger to a temperature in the range of about 400° F. to 600° F. by indirect heat exchange with a stream of saturated gaseous hydrocarbonaceous fuel on its way to the gas generator.

Heat and condensate from the shifted process gas stream and referred to herein as shift condensate are advantageously recovered in the low level heat recovery section of the subject process. The low level heat recovery section comprises from about 2 to 7, such as 3 indirect heat exchangers in series through which the process gas stream flows and is thereby cooled and cooling by direct contact with shift condensate which has been cooled in the feed gas saturator by water evaporation. A knock-out vessel for separating condensed water is located after each or at least the final heat exchanger. About 20–100 wt. % condensed water e.g. shift condensate which is collected in the knock-out vessels plus about 0–80 wt. % make-up water, such as boiler feed water (BFW) is pumped into the previously described gas scrubber at a temperature in the range of 100° F. to 500° F. and into the feed gas saturator at a temperature in the range of about 250° F. to 500° F. The coolant for at least one of the heat exchangers in said low level heat recovery section is boiler feed water at a temperature in the range of about ambient to 400° F., such as about 100° F. to 250° F. The BFW may be thereby heated by indirect heat exchange with the hot process gas stream to a temperature in the range of about 225° F. to 500° F. Medium pressure steam having a pressure in the range of about 150 to 1000 psia, such as about 200 to 750 psia, may be produced. Also, low pressure process steam having a pressure in the range of about 5 to 150 psia, such as about 30 to 50 psia, may be produced in one of the indirect heat exchangers. Low pressure steam may be used in the Acid Gas Recovery Unit (AGRU) for example as a stripping agent for solvent recovery, and in the Sulfur Recovery Unit (SRU). By the aforesaid multiple heat exchangers, the temperature of the process fuel gas stream may be reduced in the following steps: (1) 250° F. to 500° F., (2) 225° F. to 400° F., and (3) 80° F. to 120° F. Thus, in the subject process, low level heat from process cooling is efficiently used in a multiplicity of heat exchangers which provide the heat for (1) saturating the fuel gas, (2) producing medium and low pressure steam, and (3) producing hot water.

Hot water comprising about 20 to 100 wt. % shift condensate and any remainder comprising make-up water leaving from the bottom of the feed gas saturator at a temperature in the range of about 100° F. to 400° F. is introduced into the cooled process gas stream leaving the third indirect heat exchanger where BFW at a temperature in the range of about ambient to 400° F. is heated to medium pressure steam or hot boiler feed water at a temperature in the range of about 225° F. to 500° F. The resulting mixture of process gas and saturator bottoms water at a temperature in the range of about 250° F. to 500° F. is mixed with a mixture comprising 20 to 100 wt. % shift condensate and the remainder, if any, comprising make-up water at a temperature in the range of about 100° F. to 300° F. By mixing the water with the process gas stream, the water is heated. The mixed stream of process gas, shift condensate, and make-up water containing about 10 to 70 mole % water and being at a temperature in the range of about 250° F. to 500° F. and below the dewpoint is introduced into a first knock-out pot where the portion of the water in the process gas stream that is liquid, e.g., 10 to 80 wt. %, is separated from the process gas stream. At least a portion, e.g., 10 to 100 wt. % of the water from the first knock-out vessel is sent to the feed gas saturator. Of the remainder, about 0 to 100 wt. % is mixed with the condensate from any subsequent heat exchangers and sent to the gas scrubber.

Next, in a fourth indirect heat exchanger, the process gas stream leaving said first knock-out vessel at a temperature in the range of about 250° F. to 500° F. is cooled to a temperature below the dewpoint by indirect heat exchange with BFW which enters said fourth heat exchanger at a temperature in the range of about 75° F. to 300° F. and leaves as low pressure steam at a temperature in the range of about 225° F. to 375° F. and a pressure in the range of about 5 to 150 psia. The process gas stream leaving the fourth heat exchanger at a temperature in the range of about 225° F. to 400° F. and containing about 3 to 50 mole % $H_2O$ is introduced into a second knock-out vessel. Shift condensate at a temperature in the range of about 225° F. to 400° F. is removed through a line at the bottom of the second knock-out vessel.

Next, in a fifth indirect heat exchanger, the process gas stream leaving said second knock-out vessel is cooled to a temperature below the dewpoint by indirect heat exchange with BFW or cooling water which enters said fifth heat exchanger at a temperature in the range of about 60° F. to 120° F. and leaves as hot water at a temperature in the range of about 80° F. to 300° F. The process gas stream leaving the fifth heat exchanger at a temperature in the range of about 80° F. to 120° F. and containing about 2 to 25% $H_2O$ is introduced into a third knock-out vessel. Shift condensate at a temperature in the range of about 80° F. to 120° F. is removed through a line at the bottom of the third knock-out vessel while process gas with 0.1 to 2.0 volume % $H_2O$ is removed through a line at the top of the vessel. A mixture of shift condensate and any make-up water from the bottom of knock-out vessels 1, 2, and 3 is recycled to the scrubber. Optionally, a portion, e.g., 0 to 80 wt. %, of said mixture may be mixed with the mixture of the process gas stream leaving the third heat exchanger and the water from the bottom of the saturator and introduced into the first knock-out vessel.

The process gas stream leaving the third or last knock-out vessel at a temperature in the range of about 80° F. to 120° F. may be purified by any suitable conventional system, for example, in an acid gas recovery zone (AGR) employing physical or chemical absorption with a liquid solvent, e.g., cold methanol, N-methyl-pyrrolidone, dimethyl ether of polyethylene glycol, and inhibited or uninhibited amine. Acid gases, e.g., $CO_2$, $H_2S$, and COS are highly soluble in methanol at high pressures and low temperature. When the pressure is reduced and the temperature of the rich solvent raised, these gases may be readily stripped from the solvent. The $H_2S$ and COS may be concentrated into a fraction suitable for feeding a conventional Claus unit, i.e., Sulfur Recovery Unit (SRU) where elemental sulfur is produced. See Kirk-Othmer Encyclopedia of Chemical Technology, Second Edition, Vol. 19, John Wiley, 1969, page 353. Reference is made to coassigned U.S. Pat. No. 4,052,176. These references are incorporated herein by reference.

DESCRIPTION OF THE DRAWING

Figure 1:
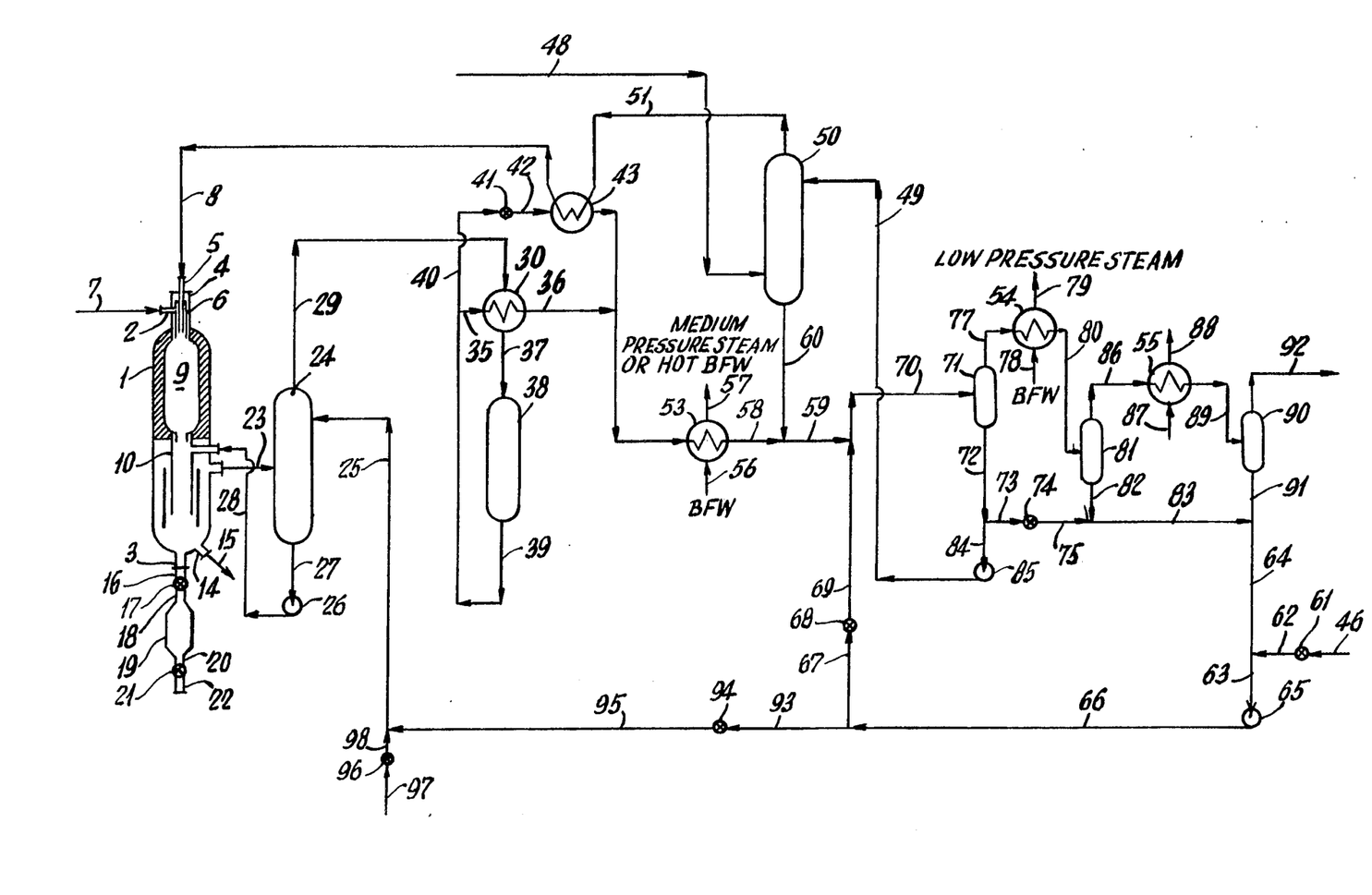

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, free-flow noncatalytic refractory lined fuel gas generator 1 as previously described is equipped with axially aligned upstream flanged inlet port 2 and downstream flanged exit port 3. Annulus type burner 4, as previously described, with center conduit 5 in alignment with the axis of gas generator 1 is mounted in inlet port 2. A concentric coaxial annulus passage 6 is also provided.

A stream of substantially pure oxygen in line 7 is introduced by way of annular passage 6 of burner 4. A stream of water saturated gaseous hydrocarbonaceous fuel in line 8 is introduced by way of central passage 5. The two feedstreams impact together, mix, and react by partial oxidation in reaction zone 9 of gas generator 1. The hot stream of raw fuel gas comprising $H_2$, CO, $CO_2$, $H_2O$, $N_2$, A, $H_2S$, and COS passes down through dip tube 10 and is quench cooled in a pool of water contained in quench drum or tank 14 located at the bottom of gas generator 1. Quench water containing entrained particulate carbon is removed through line 15 and resolved in a carbonrecovery and water reclamation zone. Slag and particulate matter are periodically removed by way of exit port 3, line 16, valve 17, line 18, lockhopper 19, line 20, valve 21, and line 22.

The quenched raw process gas stream is passed through line 23 into gas scrubbing column 24 where it is scrubbed clean of entrained soot and particulate matter by scrubbing water comprising shift condensate and make-up water from line 25. By means of pump 26, water from the bottom of scrubbing column 24 is pumped through lines 27 and 28 and into quench tank 14. The clean raw process gas stream leaving gas scrubbing column 24 through line 29 is preheated in first heat exchanger 30 by indirect i.e. noncontact heat exchange with a first portion of subsequently produced shifted process gas stream. The first shifted process gas stream enters first heat exchanger 30 through line 35 and leaves at a reduced temperature through line 36. The preheated stream of hot raw process gas leaving first heat exchanger 30 leaves by line 37 and enters catalytic water-gas shift converter 38. CO and $H_2O$ in the raw process gas stream react together within said catalytic shift converter 38 to produce a shifted process gas stream comprising $H_2$-rich gas e.g. a gas comprising about 30 to 60 vol. % $H_2$ and 0 to 10 vol. % CO.

The hot shifted process gas stream leaving water-gas shift converter 38 is passed through line 39 and split into two streams. A first shifted process gas stream passes through line 35 and first indirect heat exchanger 30 as previously described. The remainder of the hot shifted process gas stream is passed through line 40, control valve 41, line 42, and second indirect heat exchanger 43 where it preheats a stream of saturated gaseous hydrocarbonaceous fuel from line 51. The gaseous hydrocarbonaceous fuel feed to the system in line 48 is saturated with water comprising shift condensate and make-up water from line 49 in saturating column 50. The stream of saturated gaseous hydrocarbonaceous fuel in line 51 is then preheated in second indirect heat exchanger 43, as previously described, and passed through line 8 and into central conduit 5 of burner 4, as previously described.

The stream of shifted process gas leaving first heat exchanger 30 by way of line 36 and the stream of shifted process gas stream leaving second heat exchanger 43 by way of line 44 are mixed together in line 52 and then passed through a low temperature cooling section comprising a plurality of indirect heat exchangers connected in series e.g. third heat exchanger 53, fourth heat exchanger 54, and fifth heat exchanger 55. In third heat exchanger 53, boiler feed water (BFW) from line 56 is converted into medium pressure steam or hot BFW which leaves third heat exchanger 53 by way of line 57. The stream of shifted process gas is cooled below the dew point in third heat exchanger 53 and then leaves by way of line 58. In line 59, the process gas stream from line 58 is mixed with water comprising shift condensate with or without make-up water from line 60 at the bottom of gas saturator 50.

In one embodiment, fresh make-up water is introduced into the system through line 46, valve 61, line 62 and is mixed in line 63 with a mixture of shift condensate and make-up water from line 64. By means of pump 65, a portion e.g. 0–80 wt. % of the mixture of shift condensate and make-up water in line 63 is pumped through lines 66 and 67, control valve 68, and line 69 into line 70 where it is mixed with the mixture of shifted process gas stream and shift condensate and make-up water from line 59. The remainder of the shift condensate and make-up water in line 66 is passed through line 93, valve 94, line 95, line 25 and into scrubbing column 24. In one embodiment with valve 61 closed, make-up water from a separate line may be introduced into lines 25 and/or 69. For example, with valve 96 open and valve 94 open or closed, make-up water from line 97 may be passed through line 98 into line 25.

The mixture of shifted process gas stream, shift condensate, and make-up water in line 70 is introduced into first knock-out vessel 71 where entrained liquid moisture comprising shift condensate and make-up water is separated and leaves through line 72. By mixing the water with the process gas stream, the water is heated. Dewatered process gas stream leaves through line 77, and is cooled to a temperature below the dew point in fourth indirect heat exchanger 54. The coolant is BFW which enters through line 78 and leaves as low pressure steam through line 79. The cooled process gas stream in line 80 is dewatered in knock-out vessel 81. A mixture comprising about 10 to 100 wt. % shift condensate and the remainder make-up water leaves through line 82 and is mixed in line 83 with the mixture comprising about 10 to 100 wt. % shift condensate and the remainder make-up water from lines 72, 73, control valve 74, and line 75. About 2 to 50 wt. % of the water in line 72 is passed through line 73, and the remainder is pumped through lines 84 and 49 into gas saturator 50 by means of pump 85.

The shifted process gas stream leaving the second knock-out vessel 81 is passed through line 86 into fifth indirect heat exchanger 55 where it is cooled to a temperature below the dew point by BFW coolant. The coolant enters heat exchanger 55 through line 87 and leaves as hot water through line 88. The process gas stream with entrained moisture in line 89 is passed into the third knock-out vessel 90 where condensed water comprising about 10 to 100 wt. % of shift condensate and the remainder comprising make-up water settles to the bottom and is removed through line 91. By means of the subject process, condensed water from the bottom of knock-out vessels 71, 81 and 90 in admixture with shift condensate and make-up water is recycled to the gaseous fuel saturator 50 and gas scrubber 24. Dewatered hydrogen-rich gas is removed through line 92 and optionally purified to remove acid gases. The hydrogen-rich gas comprising about 40 to 100 mole % $H_2$ may be used as a reducing gas or as a hydrotreating gas.

Various modifications of the invention as hereinbefore set forth may be made without departing from the spirit and scope thereof; and, therefore, only such limitations should be made as are indicated in the appended claims.

I claim:

1. A partial oxidation process for the production of $H_2$-rich gas comprising:
    (1) reacting by partial oxidation a fuel feed comprising a hydrocarbonaceous fuel having a minimum C/H weight ratio of 3.3 and comprising a stream of water saturated gaseous hydrocarbonaceous fuel or a mixed stream of said saturated gaseous hydrocarbonaceous fuel and a liquid hydrocarbonaceous fuel at a temperature in the range of about 2000° F. to 2800° F., and a pressure in the range of about 200 to 2500 psia, with a stream of substantially pure oxygen gas at an atomic ratio of oxygen gas to carbon in the fuel in the range of about 0.6 to 1.6, a weight ratio $H_2O$/fuel in the range of about 0.1 to 5.0, and including supplemental $H_2O$ temperature moderator, wherein said partial oxidation reaction takes place in the reaction zone of a free-flow non-catalytic partial oxidation gas generator to produce a process stream of synthesis gas comprising $H_2$, CO, $CO_2$, $H_2O$, $N_2$, $H_2S$, COS and particulate carbon, and having a reducing mole ratio $H_2+CO/H_2O+CO_2$ in the range of about 5 to 15;

(2) quench cooling and scrubbing the process gas stream from (1) with water in gas quenching and scrubbing zones to produce clean process gas stream having a temperature in the range of about 300° F. to 600° F.;

(3)(a) heating the process gas stream from (2) to a temperature in the range of about 500° F. to 700° F. by indirect heat exchange with a first portion of the direct shifted process gas stream from subsequent step (4); and (b) passing the remainder of said direct shifted process gas stream from step (4) in indirect heat exchange with water saturated hydrocarbonaceous gaseous fuel from subsequent step (9), thereby heating said gaseous hydrocarbonaceous fuel feed to a temperature in the range of about 400° F. to 800° F., and introducing said heated water saturated gaseous fuel feed into said partial oxidation gas generator in (1) as at least a portion of the fuel;

(4) passing the heated process gas stream from step (3)(a) through a catalytic water-gas direct shift conversion zone to produce a $H_2$-rich shifted process gas stream having a reducing mole ratio $H_2+CO/H_2O+CO_2$ of less than 2;

(5) combining the two streams of partially cooled direct shifted process gas stream from (3)(a) and (3)(b) and partially cooling the combined process gas stream to a temperature in the range of about 260° F. to 550° F. by indirect heat exchange with boiler feed water thereby producing medium pressure steam or hot boiler feed water;

(6) mixing the partially cooled shifted process gas stream from step (5) with supplemental shift condensate from the bottom of the gas saturating zone in subsequent step (9), wherein said supplemental shift condensate is heated by direct contact with said partially cooled shifted process gas stream;

(7) dewatering the mixture of shifted process gas and shift condensate from (6) in a knock-out chamber and separating heated shift condensate;

(8) cooling and dewatering the shifted process gas stream from step (7) in a dewatering process gas stream zone to produce shift condensate by cooling the process gas stream below the dew point and collecting the condensed water in at least one knock-out chamber; and (9) saturating a feedstream of hydrocarbonaceous gaseous fuel with at least a portion of said heated shift condensate from step (7) in a gas saturating zone, and removing excess shift condensate from the bottom of said gas saturating zone for use in step (6).

2. The process of claim 1 provided with the step of mixing make-up water with the supplemental shift condensate and partially cooled shifted process gas stream in step (6).

3. The process of claim 1 provided with the step of mixing said shift condensate from step (8) with the supplemental shift condensate and partially cooled shifted process gas stream in step (6).

4. The process of claim 3 provided with the step of mixing make-up water with said shift condensate from step (8).

5. The process of claim 1 provided with the step of introducing said shift condensate from step (8) into said gas scrubbing and quenching zones in step (2).

6. The process of claim 5 provided with the step of mixing make-up water with said shift condensate.

7. The process of claim 1 provided with the step of introducing make-up water into said gas quench cooling and/or scrubbing zones in step (2).

8. The process of claim 1 wherein said catalytic water-gas shift conversion zone in step (4) contains a CO—Mo catalyst comprising in weight percent CoO 2–5, $MoO_3$ 8–16, MgO nil-20, and $Al_2O_3$ 59–85.

9. The process of claim 1 where in step (4) said $H_2$-rich shifted process gas stream is produced at a temperature in the range of about 500° F. to 1050° F. and a pressure which is substantially the same as that in the reaction zone of the partial oxidation gas generator in step (1) less ordinary pressure drop in the lines.

10. The process of claim 1 where in step (5) said shifted process gas stream from step (4) is cooled stepwise in a plurality of indirect heat exchangers, and shift condensate for quench cooling and scrubbing the process gas stream in (2) is separated from the process gas stream.

11. The process of claim 10 wherein the coolant for said heat exchangers is boiler feed water.

12. The process of claim 11 wherein said boiler feed water is converted into medium pressure steam in one heat exchanger and into low pressure steam in another heat exchanger.

13. The process of claim 12 wherein said medium pressure steam is used as the working fluid in a power generating steam turbine.

14. The process of claim 12 wherein said medium pressure steam is used as a stripping agent for solvent recovery.

15. The process of claim 1 provided with the step of separating air in a conventional air separation unit into a stream of substantially pure oxygen gas and a stream of nitrogen gas, and introducing said oxygen gas stream into said reaction zone of a partial oxidation gas generator in step (1).

16. The process of claim 1 where in said gas saturating zone in (9) said gaseous hydrocarbonaceous feedstream to step (3) at a temperature in the range of about 250° F. to 450° F. and a pressure in the range of about 20 to 400 psia greater than that in the reaction zone of the partial oxidation gas generator is directly contacted by shift condensate and make-up water at a temperature in the range of about 250° F. to 500° F.

17. The process of claim 1 wherein said gaseous hydrocarbonaceous fuel is selected from the group consisting of refinery off-gas, mixtures of $C_1$–$C_4$ hydrocarbonaceous gases, and waste carbon-containing gases from chemical processes.

18. The process of claim 1 wherein said gaseous hydrocarbonaceous fuel is a gas stream generated by a unit in a petroleum refinery selected from the group consisting of fluid catalytic cracker (FCC) unit, delayed and fluidized coking units, catalytic reforming unit, and hydrotreating unit.

19. The process of claim 1 wherein said gaseous hydrocarbonaceous fuel comprises a mixture of a plurality of gaseous components selected from the group consisting of $H_2$, $N_2$, $O_2$, RSH, $CH_4$, $C_2H_4$, $C_2H_6$, $C_3H_6$, $C_3H_8$, $C_4H_{10}$, $C_5H_{10}$, $C_5H_{12}$, CO, $CO_2$ and $H_2O$.

20. The process of claim 1 wherein said liquid hydrocarbonaceous fuel is selected from the group consisting of pumpable liquid hydrocarbon materials, pumpable liquid slurries of solid carbonaceous materials, and mixtures thereof.

21. The process of claim 1 wherein said liquid hydrocarbonaceous fuel is selected from the group consisting of liquefied petroleum gas, petroleum distillates and residua, gasoline, naphtha, kerosine, crude petroleum, asphalt, gas oil, residual oil, tar sand oil and shale oil, coal derived oil, aromatic hydrocarbons, coal tar, cycle gas oil from fluid-catalytic-cracking operations, furfural extract of coker gas oil, and mixtures thereof.

22. The process of claim 1 wherein said liquid hydrocarbonaceous fuel is selected from the group consisting of oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures therof.

23. The process of claim 1 wherein said liquid hydrocarbonaceous fuel is a pumpable slurry of solid carbonaceous fuels selected from the group consisting of coal, particulate carbon, petroleum coke, concentrated sewer sludge, and mixtures thereof, in a vaporizable liquid carrier, selected from the group consisting of water, liquid $CO_2$, liquid hydrocarbon fuel, and mixtures thereof.

24. The process of claim 1 provided with the step of introducing said water saturated gaseous hydrocarbonaceous fuel stream into said reaction zone of the partial oxidation gas generator in step (1) by way of the central conduit of a burner comprising said central conduit and a coaxial concentric outer annular passage, and simultaneously passing said substantially pure oxygen gas stream through said outer annular passage; wherein said streams impact together, atomize, and react by partial oxidation in said reaction zone.

25. The process of claim 1 provided with the step of introducing said streams of substantially pure oxygen gas into said reaction zone of the partial oxidation gas generator in step (1) by way of the central conduit of a burner comprising said central conduit and coaxial concentric intermediate and outer annular passages, and simultaneously passing said liquid hydrocarbonaceous fuel stream with or without admixture with steam, through said intermediate annular passage and said stream of saturated gaseous hydrocarbonacveous fuel through said outer annular passage; wherein said streams impact together, atomize, and react by partial oxidation in said reaction zone.

26. A partial oxidation process for the production of $H_2$-rich gas comprising:
(1) reacting by partial oxidation a fuel feed comprising a hydrocarbonaceous fuel having a minimum C/H weight ratio of 3.3 and comprising a stream of water saturated gaseous hydrocarbonaceous fuel or a mixed stream of said saturated gaseous hydrocarbonaceous fuel and a liquid hydrocarbonaceous fuel at a temperature in the range of about 2000° F. to 2800° F., and a pressure in the range of about 200 to 2500 psia, with a stream of substantially pure oxygen gas at an atomic ratio of oxygen gas to carbon in the fuel in the range of about 0.6 to 1.6, a weight ratio $H_2O$/fuel in the range of about 0.1 to 5.0, and including supplemental $H_2O$ temperature moderator when the heating value of said fuel feed is greater than 1200 BTU/SCF, wherein said partial oxidation reaction takes place in the reaction zone of a free-flow non-catalytic partial oxidation gas generator to produce a process stream of synthesis gas comprising $H_2$, CO, $CO_2$, $H_2O$, $N_2$, $H_2S$, COS and particulate carbon, and having a reducing mole ratio $H_2+CO/H_2O+CO_2$ in the range of about 5 to 15;

(2) quench cooling and scrubbing the process gas stream from (1) with water in gas quenching and scrubbing zones to produce clean process gas stream having a temperature in the range of about 300° F. to 600° F.;

(3)(a) heating the process gas stream from (2) to a temperature in the range of about 500° F. to 700° F. by indirect heat exchange with the direct shifted process gas stream from subsequent step (4); and (b) partially cooling the direct shifted process gas stream from step (3)(a) to a temperature in the range of about 425° F. to 675° F. by indirect heat exchange with water saturated hydrocarbonaceous gaseous fuel from subsequent step (9), thereby heating said gaseous hydrocarbonaceous fuel feed to a temperature in the range of about 400° F. to 800° F., and introducing said heated water saturated gaseous fuel feed into said partial oxidation gas generator in (1) as at least a portion of the fuel;

(4) passing the heated process gas stream from step (3) (a) through a catalytic water-gas direct shift conversion zone to produce a $H_2$-rich shifted process gas stream having a reducing mole ratio $H_2+CO/H_2O+CO_2$ of less than 2;

(5) partially cooling the shifted process gas stream from (3) (b) to a temperature in the range of about 260° F. to 550° F. by indirect heat exchange with boiler feed water thereby producing medium pressure steam or hot boiler feed water;

(6) mixing the partially cooled shifted process gas stream from step (5) with supplemental shift condensate from the bottom of the gas saturating zone in subsequent step (9), wherein said supplemental shift condensate is heated by direct contact with said partially cooled shifted process gas stream;

(7) dewatering the mixture of shifted process gas and shift condensate from (6) in a knock-out chamber and separating heated shift condensate;

(8) cooling and dewatering the shifted process gas stream from (7) in a dewatering process gas stream zone to produce shift condensate by cooling the process gas stream below the dew point and collecting the condensed water in at least one knock-out chamber; and (9) saturating a feedstream of hydrocarbonaceous gaseous fuel with at least a portion of said heated shift condensate from step (7) in a gas saturating zone, and removing excess shift condensate from the bottom of said gas saturating zone for use in step (6).

27. The process of claim 26 provided with the step of mixing make-up water with the supplemental shift condensate and partially cooled shifted process gas stream in step (6).

28. The process of claim 26 provided with the step of mixing said shift condensate from step (8) with the supplemental shift condensate and partially cooled shifted process gas stream in step (6).

29. The process of claim 28 provided with the step of mixing make-up water with said shift condensate from step (8).

30. The process of claim 26 provided with the step of introducing said shift condensate from step (8) into said gas scrubbing and quenching zones in step (2).

31. The process of claim 30 provided with the step of mixing make-up water with said shift condensate.

32. The process of claim 26 provided with the step of introducing make-up water into said gas quench cooling and/or scrubbing zones in step (2).

33. The process of claim 26 where in step (5) said shifted process gas stream from step (4) is cooled stepwise in a plurality of indirect heat exchangers, and shift condensate is separated from the process gas stream.

34. The process of claim 26 wherein said liquid hydrocarbonaceous fuel is selected from the group consisting of oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures therof.

35. The process of claim 26 wherein said liquid hydrocarbonaceous fuel is a pumpable slurry of solid carbonaceous fuels selected from the group consisting of coal, particulate carbon, petroleum coke, concentrated sewer sludge, and mixtures thereof, in a vaporizable liquid carrier, selected from the group consisting of water, liquid $CO_2$, liquid hydrocarbon fuel, and mixtures thereof.

36. The process of claim 26 provided with the step of introducing said water saturated gaseous hydrocarbonaceous fuel stream into said reaction zone of the partial oxidation gas generator in step (1) by way of the central conduit of a burner comprising said central conduit and a coaxial concentric outer annular passage, and simultaneously passing said substantially pure oxygen gas stream through said outer annular passage; wherein said streams impact together, atomize, and react by partial oxidation in said reaction zone.

37. The process of claim 26 provided with the step of introducing said water saturated gaseous hydrocarbonaceous fuel stream into said reaction zone of the partial oxidation gas generator in step (1) by way of the central conduit of a burner comprising said central conduit and a coaxial concentric outer annular passage, and simultaneously passing said substantially pure oxygen gas stream through said outer annular passage; wherein said streams impact together, atomize, and react by partial oxidation in said reaction zone.

38. The process of claim 26 wherein said gaseous hydrocarbonaceous fuel is selected from the group consisting of refinery off-gas, mixtures of $C_1$–$C_4$ hydrocarbonaceous gases, and waste carbon-containing gases from chemical processes.

39. The process of claim 26 wherein said gaseous hydrocarbonaceous fuel is a gas stream generated by a unit in a petroleum refinery selected from the group consisting of fluid catalytic cracker (FCC) unit, delayed and fluidized coking units, catalytic reforming unit, and hydrotreating unit.

40. The process of claim 26 wherein said gaseous hydrocarbonaceous fuel comprises a mixture of a plurality of gaseous components selected from the group consisting of $H_2$, $N_2$, $O_2$, RSH, $CH_4$, $C_2H_4$, $C_2H_6$, $C_3H_6$, $C_3H_8$, $C_4H_{10}$, $C_5H_{10}$, $C_5H_{12}$, CO, $CO_2$ and $H_2O$.

41. The process of claim 26 wherein said liquid hydrocarbonaceous fuel is selected from the group consisting of pumpable liquid hydrocarbon materials, pumpable liquid slurries of solid carbonaceous materials, and mixtures thereof.

42. The process of claim 26 wherein said liquid hydrocarbonaceous fuel is selected from the group consisting of liquefied petroleum gas, petroleum distillates and residua, gasoline, naphtha, kerosine, crude petroleum, asphalt, gas oil, residual oil, tar sand oil and shale oil, coal derived oil, aromatic hydrocarbons, coal tar, cycle gas oil from fluid-catalytic-cracking operations, furfural extract of coker gas oil, and mixtures thereof.

* * * * *